Patented May 14, 1929.

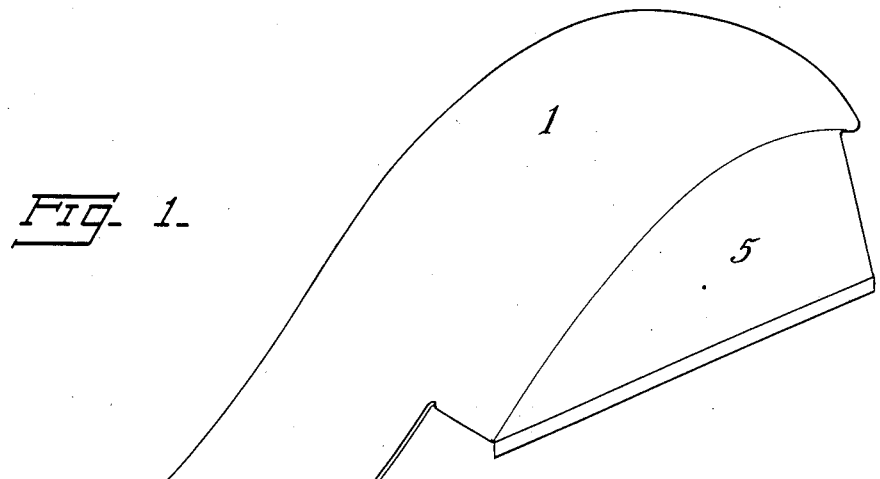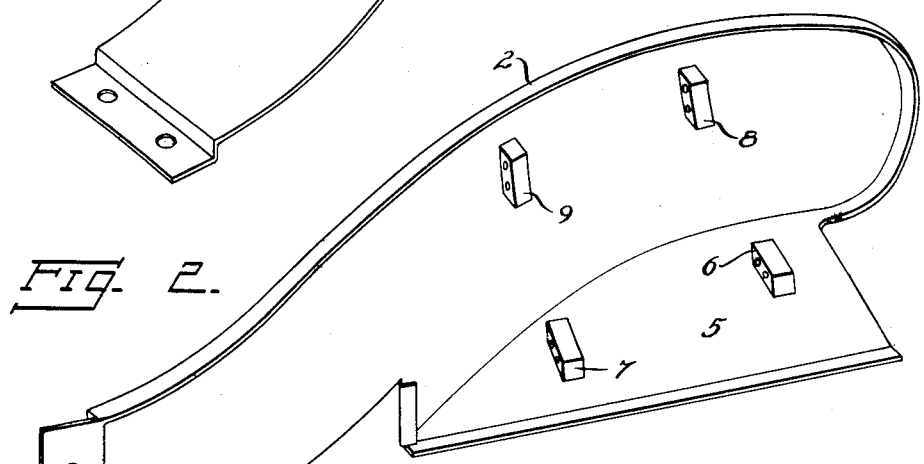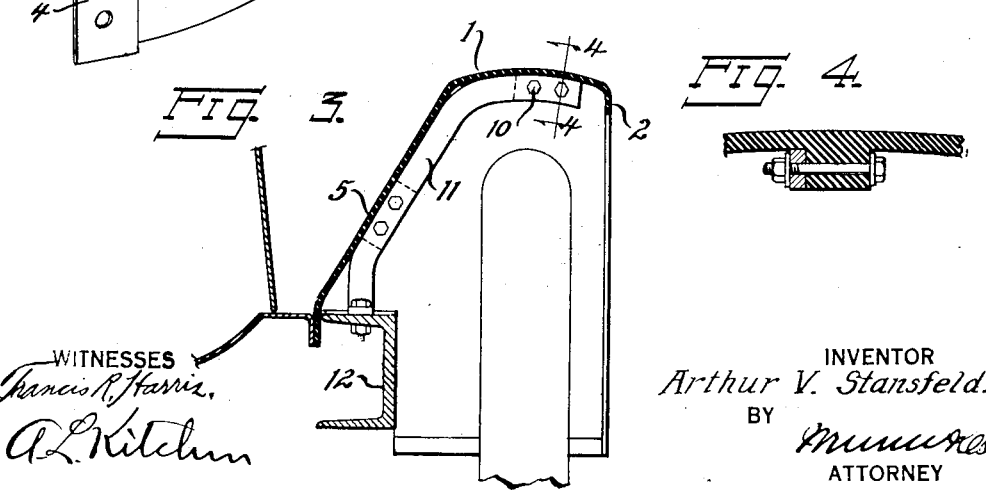

1,713,405

UNITED STATES PATENT OFFICE.

ARTHUR V. STANSFELD, OF NEW YORK, N. Y.

DUST GUARD.

Application filed February 4, 1928. Serial No. 251,834.

This invention relates to an improved dust guard for automobiles or other vehicles, and has for an object to provide a construction made of resilient material throughout, and of such a consistency that it will yield and then return to form after an appreciable blow.

A further object of the invention is to provide a dust guard commonly known on the market as mud guards, formed completely of rubber.

A further object, more specifically, is to provide a rubber dust or mud guard for automobiles or other vehicles, wherein substantially the usual shape is maintained while integral blocks and stiffening members are presented to hold the parts in position and to permit a guard to be secured to the vehicle.

In the accompanying drawing—

Figure 1 is a perspective view of a dust guard disclosing an embodiment of the invention.

Figure 2 is an inverted perspective view of the guard shown in Figure 1.

Figure 3 is a detail fragmentary sectional view through a part of an automobile with a guard embodying the invention applied thereto.

Figure 4 is an enlarged fragmentary sectional view through Figure 3 on line 4—4.

Referring to the accompanying drawing by numerals, 1 indicates the body of a mud guard which is formed of rubber and integral with this body there is provided a flange 2 merging into an end section 3, which in turn merges into an apertured clamping section 4 designed to receive bolts or other fastening means for fastening that end of the guard in place. The flange 2 near the front end merges into a side plate 5. This side plate is supplied with integral blocks 6 and 7 aligned with blocks 8 and 9 formed integral with the body 1. As indicated in Figures 3 and 4, these blocks are not only formed integral with the other parts of the guard, but are provided with apertures for accommodating the respective bolts 10 which extend through these blocks and through the usual supporting arms 11 bolted or otherwise rigidly secured to the automobile chassis 12. As indicated in Figure 3, the arm 11 is connected to the side plate 5 through one of the blocks carried by the plate 5, while the outer end of the arm is connected to the body 1 through one of the blocks carried by the body. In this way there is a two point support bolted or otherwise rigidly secured to the guard. Preferably the arm 11 is also formed so as to engage the under surface of the guard whereby all of the weight will not be carried by the bolts, though this might be done if desired. It will be, of course, understood that the entire guard could be made of any desired thickness of rubber and of any desired quality. Preferably, however, the guard is made of a rather high grade quality of rubber with the body and flanges comparatively thin, while the blocks or lugs 6 to 9 inclusive, are comparatively heavy so as to properly co-act with the bolts 10 and distribute the strain therefrom. By being formed of rubber the guards will yield when subjected to a slight blow. This yielding action will not bend the guard as is the case with sheet metal guards, but will merely press the guard to one side and the guard will automatically return or resume its former position as soon as the pressure is relieved.

In manufacturing the guards, they may be made black or any desired color by adding proper coloring matter to the rubber mixture. Also, if desired, the guards might be painted in the usual manner without departing from the spirit of the invention. In the use of metal guards, even a slight blow will make a dent and where the blow is considerable, the guard is bent out of shape. By forming the guard of rubber which is comparatively stiff, but yet very resilient, a slight blow will have no effect whatever except a slight bowing action, while a considerable blow will press the parts of the guard to one side but as soon as the pressure is removed, the guard will automatically return to its former position without any injury except a possible scratch which may be readily covered with a new coat of paint.

What I claim is:

A rubber dust guard for vehicles, comprising a body of sheet rubber of substantially the same thickness throughout, said body being formed with a top arc-shaped member and a depending side plate, a plurality of spaced blocks on the under surface of said top arc-shaped member formed integral therewith, and a plurality of spaced blocks on the inner face of said side plate formed integral therewith, all of said blocks being thicker than said body and formed with apertures for receiving bolts, whereby the blocks may be bolted to a support and the guard held in place thereby.

Signed at New York, in the county of New York and State of New York, this 3rd day of February, A. D. 1928.

ARTHUR V. STANSFELD.